United States Patent

[11] 3,580,219

[72] Inventor Robert C. Stebbins
601 Plateau Drive, Kensington, Calif. 94708
[21] Appl. No. 850,863
[22] Filed Aug. 18, 1969
[45] Patented May 25, 1971

[54] INSECT INSPECTION CAGE
4 Claims, 4 Drawing Figs.
[52] U.S. Cl............................................. 119/1, 119/17, 119/45
[51] Int. Cl........................................................ A01k 67/00
[50] Field of Search.......................................... 119/1, 15, 17, 18, 45, 99

[56] References Cited
UNITED STATES PATENTS

| 275,969 | 4/1883 | Woodside | 119/45X |
| 1,436,148 | 11/1922 | Burris | 119/99 |
| 2,093,784 | 9/1937 | Southwick | 119/17X |
| 2,970,565 | 2/1961 | Reynolds | 119/17 |
| 3,086,498 | 4/1963 | Reynolds et al. | 119/18X |
| 3,367,308 | 2/1968 | Quattrone et al. | 119/15 |

Primary Examiner—Aldrich F. Medbery
Attorney—Hume, Clement, Hume & Lee

ABSTRACT: A new and useful enclosure or cage for insects, such as fruit flies (Drosophila), which is especially constructed and adapted to accommodate a colony of such insects, and to provide for such colony, an environment in which the insects may reside and multiply, and in which the insects may be subjected to experimental controls in various manners as may be desired. The enclosure or cage has at least one transparent wall, whereby the insects may be viewed, studied, counted, photographed, and otherwise observed and recorded.

The enclosure or cage has a portion into which the insects may be herded, by movement of a pistonlike wall or walls, and which has a dimension in one direction which provides accommodation for only one layer of insects in that direction, whereby all of the insects in the enclosure or cage are disposed substantially in a common plane and are thus located immediately adjacent to a transparent wall, and, more specifically, between such wall and a source of light, which may be daylight or photoflash, in such manner as to permit photographic images or shadowgraphs of the mass of insects, so disposed, to be readily made for subsequent examination and counting.

Patented May 25, 1971  3,580,219
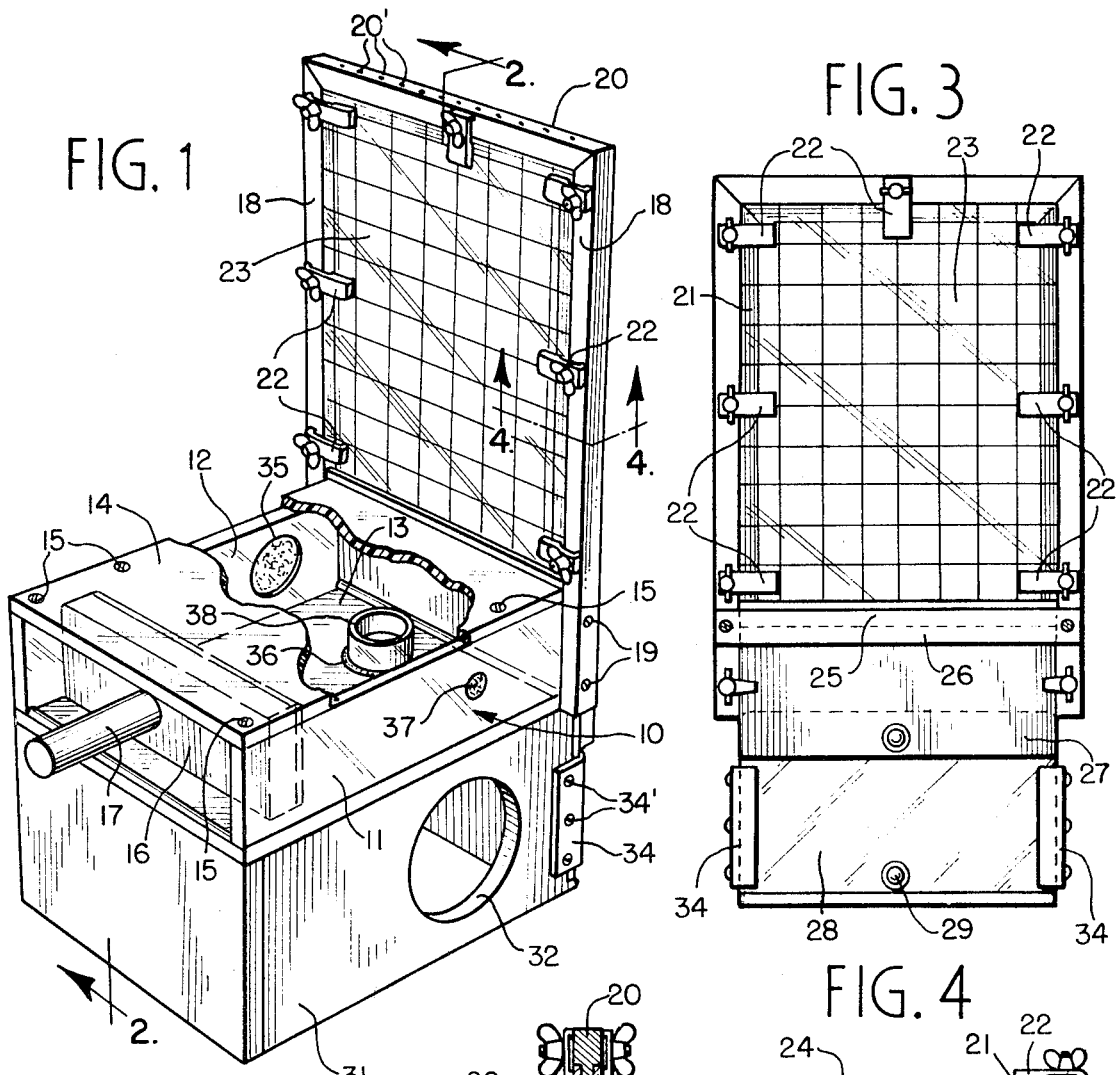
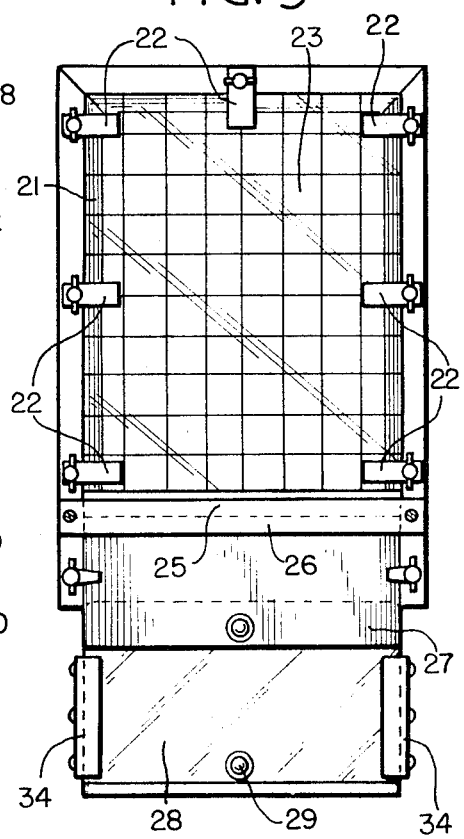
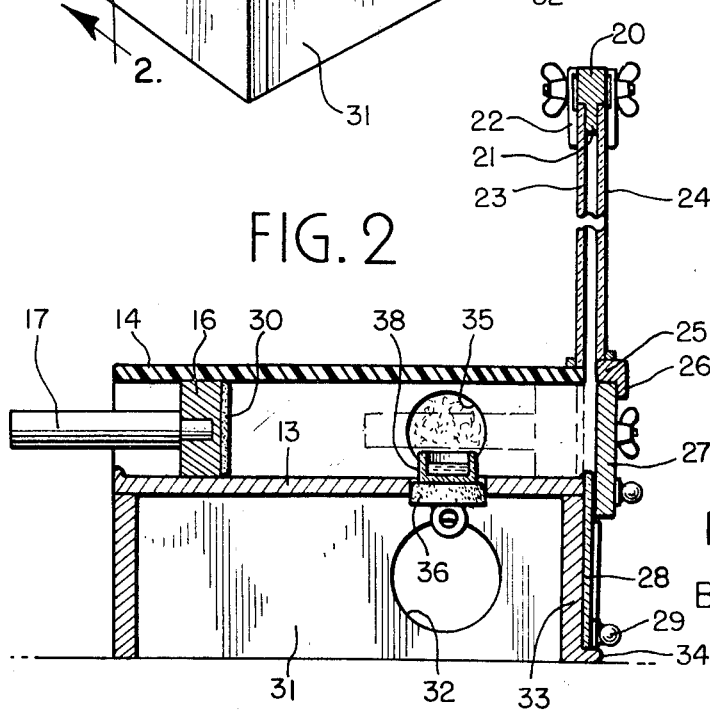
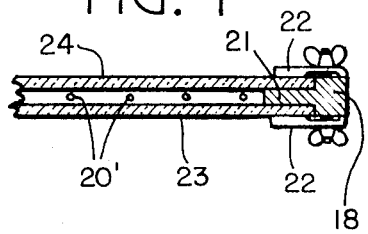
Inventor
Robert C. Stebbins
By Hume, Clement, Hume & Lee
Attorneys

INSECT INSPECTION CAGE

NATURE AND OBJECTS OF THE INVENTION

This invention relates to a new and useful enclosure or cage for insects, such, for example, as fruit flies (Drosophila), which is especially constructed and adapted to accommodate a colony of such insects and provide, for such colony, an environment in which such insects may reside and multiply, and in which they may be studied, counted, photographed, and otherwise observed and recorded, and in which they may be subjected to experimental controls.

The enclosure or cage of this invention is especially designed to make possible easy and clear viewing, photographing, and accurate counting of the insects without recourse to anesthesia. A counting grid on a transparent wall of the enclosure may be provided to facilitate the locating and counting of individual groups of insects and, at the same time, to permit viewing and improved observation of the courtship behavior, grooming, and phototaxis of the insects. In addition, long term studies of population behavior of a single colony of insects is made possible.

It is an object of this invention to provide an enclosure of the type above referred to which provides a relatively large space or area as an environment for accommodating a colony of insects or the like during normal life activities, and which is capable, by simple manipulation, of being reduced in size and confined to a viewing and counting space of limited dimension and of such shape that all of the insects are presented for viewing, counting, and photographing in a single layer.

A further object is to provide an enclosure or cage of the above described type in which reduction of the size of the enclosure or cage is effected by the movement of a wall having a pistonlike association with the other portions of said enclosure or cage, which is capable, by simple manipulation, of being moved to herd the enclosed insects into a limited portion of space within said enclosure, without harm or injury to the insects so herded, and in which the herded insects are disposed in a single layer for viewing, counting or photographing through a transparent window serving as one wall or a part of one wall of the enclosure or cage. The viewing window may, if desired, be marked with grid lines defining smaller squares or areas of other shape as an assistance in counting the insects disposed in the limited one layer space.

The construction is such as to permit the admission of light on one side of the single layer of insects and to permit the application of a photographically sensitive film or paper against the transparent wall or window in such manner as to make a photograph or shadowgraph of the layer of insects. This may be accomplished by having both walls confining the single layer of insects made of glass or other transparent material, or by having one wall transparent and the other translucent. In either case, daylight or other light may be admitted and caused to traverse the space between the walls and to permit a photographic sheet of low sensitivity to be held in contact with the transparent wall to produce a shadowgraph of the layer of insects.

Other objects of this invention are contemplated as will readily appear to one skilled in the art as the following description proceeds.

DESCRIPTION OF A PREFERRED FORM OF THE INVENTION

One specific embodiment of this invention is shown in the accompanying drawings, which now will be described:

FIG. 1 is a perspective view of an insect enclosure or cage constructed in accordance with this invention; and FIG. 2 is a side elevational view of the enclosure or cage illustrated in FIG. 1; and FIG. 3 is a front elevational view of the enclosure or cage illustrated in FIG. 1; and FIG. 4 is a cross-sectional view of a portion of the enclosure or cage illustrated in FIG. 1, taken on the line 4-4 and looking in the direction of the arrows.

Referring now to the drawings, it will be noted that the enclosure or cage of this invention as illustrated comprises a main chamber 10 having sidewalls 11 and 12, a floor 13, and a top rooflike member 14. These parts may be arranged to form a boxlike construction, and, if formed of separate parts, may be secured together by suitable screws or other suitable fasteners 15.

One open end of the enclosure thus provided may be closed by means of a wall member 16 which fits snugly within the space provided in the chamber but which, at the same time, is freely slideable in the manner of a piston whereby the space inside the chamber may be reduced as desired to any extent to a dimensional limit which will accommodate only a single layer of insects. When the cage of this invention is used for fruit flies (Drosophila), this dimension is approximately three thirty-seconds of an inch. A handle 17 may be provided on the wall 16 to facilitate the grasping of and manual movement of the wall 16.

At the opposite end of the enclosure and extending upwardly from the outside corners thereof are a pair of frame members 18-18 which are connected at their tops by a horizontal frame member 20. The upright frame members 18-18 are fastened to the sides of the enclosure by any suitable means such as screws or the like 19-19 and are preferably shaped in cross section to accommodate on each side thereof transparent sheet walls disposed on opposite sides of a central spacer strip 21. The spacer strip has a dimension such that the space provided between the wall faces is sufficient to accommodate only one layer of insects. A similar spacing strip (not shown) is also provided on the upper frame member 20. Suitable ventilating openings 20' are provided through the frame member 20 and its spacing strip. Wall plates 23 and 24, preferably of glass or other transparent material such as plastic, are provided in the frames so as to close the upper space, such plates being removably held in place by manual latches 22-22. As shown in FIG. 2 of the drawings, the lower edge of the rear transparent plate 23 contacts the upper surface of the roof member 14 of the enclosure, whereas the lower edge of the opposite transparent plate 24 contacts the upper surface of a transverse member 25 as shown in FIGS. 2 and 3. The transverse member 25 is preferably connected at its opposite ends by suitable means (not shown) to the frame members 18-18 and has a depending portion 26 adapted to overlap the upper edge of a wall 27 for closing the front end of the enclosure.

By virtue of the fact that the floor and roofing members 13 and 14, respectively, terminate short of the wall 27, an open communication is provided between the main portion of the chamber and the space above in the chamber extension located between the transparent plates 23 and 24. In fact, the spacing between the front ends of the floor and roof members and the front wall are such as to provide only a space equal to that of the space in the chamber extension.

Located in the space so provided and extending into the chamber is a sliding pistonlike wall member 28, preferably having a handle 29, adapted for movement upwardly to herd insects disposed in the forward end of the chamber upwardly into the single layer space between the transparent walls 23 and 24. The handle 29 may be in the form of a wingnut, the inner end of which extends through the wall 28 and is adapted, when tightened, to press against the underlying support to hold the wall 28 in any selected position.

When the wall member 16 is moved to its most advanced position as illustrated in dotted lines in FIG. 2, a limited space is provided between the movable pistonlike wall 16 and the front wall 27, which space is approximately of the same width as the space between the walls 23 and 24 located above. As previously stated, this dimension is only sufficient to accommodate a single layer of insects. As shown in FIG. 2, it will be noted that the upper end of the sliding wall 28, when the wall is in its extreme lower position, projects slightly above the level of the floor 13 and thus provides a curbing which serves as a stop for the pistonlike wall 16. Preferably, the face of the pistonlike wall 16 is provided with a felt or similar cover layer 30.

The entire enclosure is adapted to be mounted on a pedestal, which in the present illustration comprises a four-sided boxlike base 31 having four flat sides with an opening 32 therein to provide access to the interior of the pedestal. The front wall 33 of the pedestal has a laterally projecting foot strip 34, as shown in FIG. 2, which serves as a rest for the sliding wall 28 to limit its downward sliding movement. The sliding wall 28 is held in its proper position against the front wall 33 of the pedestal by means of angular supports 34 mounted on opposite sides of the pedestal by means of holding screws or the like 34'.

As a simplified form of this invention, the space adjacent the inside surface of the front wall 27 may be used as the viewing and counting space of the chamber. In such case, the wall 27 will be transparent and may, if desired, be provided with counting grid lines similar to those shown in FIG. 1. In such a construction, the pistonlike wall 16 will be equipped with a light source, now shown, so that, when the piston is in the advanced position to the extreme right as illustrated in FIG. 2, the single layer of insects may be observed through the transparent wall 27 and photographed by means of a photosensitive sheet placed against the wall 27 when the light source in the pistonlike wall 16 is illuminated. In this type of construction, the upper chamber between the wall plates 23 and 24 would not be necessary and, therefore, may be eliminated. In addition, the wall covering 30 would necessarily be of material that will transmit an amount of light sufficient to permit the photographs or shadowgraphs to be taken.

The enclosure or cage of this invention may be made of any suitable material such as wood, plastic, or glass, and all portions thereof may be transparent, if desired, except the floor and the pedestal portion which provide a dark enclosure for purposes hereinafter stated.

The main chamber is provided with an opening 35 in one sidewall as shown in FIG. 1, and a second opening 36 in the floor and a third opening 37 in the opposite sidewall are also provided. These openings may be closed with suitable closures such as rubber stoppers or the like. Also, an access opening 32 is provided in one sidewall of the pedestal. The stopper for closing the floor opening 36 is best shown in FIG. 2 and it serves to support a culture dish 38, as shown in FIGS. 2 and 3, for feeding and rearing the insects.

In operation, it will be apparent that the pistonlike wall 16 can be moved to change the volume of the cage, which is permitted after the culture dish has been removed. By virtue of the fact that the space in the pedestal is dark and the flies are negatively phototropic, the flies will rarely escape through the opening 36 while the dish is being removed. Openings 35 and 37 provide access for various manipulations which may be required. When the pistonlike wall 16 is in motion, the fibers of the felt contact the flies that have come to rest and cause them to take wing and thus prevent them from being crushed. When a single layer of flies is disposed in the counting chamber, photographic paper of low sensitivity may be placed against the grid wall in position to completely cover it; then by means of a suitable light, such as a photoflash, the shadows of the flies may be registered on the photographic paper. It will be noted that the front wall 27 of the cage as well as the transparent walls 23 and 24 are readily removable, whereby the cage may be kept clean.

I claim:

1. An enclosure of the type described comprising a receptacle having an opening at one end and a pistonlike member slideably mounted in said open end to provide a closed chamber for housing insects or the like, an extension of said receptacle extending in a different direction from one end thereof and comprising two closely spaced flat walls and other wall means constituting with said two flat walls a counting and photographing chamber in open communication at one of its ends with said first-named chamber, and a second pistonlike member constituting a moving wall adapted to pass between the pistonlike member and closing wall of said first chamber for herding insects therein.

2. An enclosure or cage for insects having at least a first portion and a second portion into which the insects may be herded, said first portion having a dimension in one direction which provides accommodation for only a single layer of insects, a movable pistonlike wall member adapted to move through said second portion of said enclosure or cage for herding insects therein into said first portion, said first portion having a transparent wall against which a single layer of insects are closely disposed when so herded, whereby the insects may be readily viewed and photographed through said transparent wall while so disposed in said first portion.

3. An enclosure or cage of the type defined in claim 2 further characterized in that said first portion also having a wall opposite said transparent wall adapted to transmit light for producing photographic images of said insects disposed in said first portion.

4. An enclosure or cage of the type defined in claim 2 further characterized in that said enclosure or cage is provided with a second movable pistonlike wall member adapted, upon movement, to herd insects in said enclosure or cage into said second portion thereof.